United States Patent [19]
Johnston

[11] 3,934,644
[45] Jan. 27, 1976

[54] REMOTE ENGINE WATER COOLER

[75] Inventor: Laird E. Johnston, Birmingham, Mich.

[73] Assignee: General Motors Corporation, Detroit, Mich.

[22] Filed: Dec. 12, 1973

[21] Appl. No.: 423,882

[52] U.S. Cl............ 165/51; 123/41.49; 123/198 E; 165/85; 123/41.02; 181/33 K; 123/41.47
[51] Int. Cl.²............................................. F01P 5/00
[58] Field of Search................................ 165/41–44, 165/51, 107, 85, 74; 123/41.43, 41.44, 41.47, 41.48, 41.49, 41.46, 198 E; 237/12.3 B; 181/33 K

[56] References Cited
UNITED STATES PATENTS

| | | | |
|---|---|---|---|
| 1,519,812 | 12/1924 | Schneider | 123/41.49 X |
| 2,123,358 | 7/1938 | Grutzner | 123/198 E |
| 2,918,805 | 12/1959 | Schjolin | 62/243 X |
| 3,001,479 | 9/1961 | Swenson et al. | 165/85 X |
| 3,163,995 | 1/1965 | Maier | 62/241 X |
| 3,217,697 | 11/1965 | Mayr | 123/41.49 |
| 3,684,053 | 8/1972 | Fachbach et al. | 123/198 E X |
| 3,774,710 | 11/1973 | Gustavsson | 181/33 K X |
| 3,827,523 | 8/1974 | Williams | 123/41.49 X |

FOREIGN PATENTS OR APPLICATIONS

| | | | |
|---|---|---|---|
| 95,417 | 4/1939 | Sweden | 237/12.3 B |
| 921,128 | 3/1963 | United Kingdom | 123/41.49 |
| 727,548 | 3/1932 | France | 237/12.3 B |

Primary Examiner—Albert W. Davis, Jr.
Attorney, Agent, or Firm—K. H. MacLean, Jr.

[57] ABSTRACT

A vehicle cooling system utilizing a remotely located radiator and cooling fan permitting the vehicle engine to be enclosed by insulating material for reducing noise. The radiator in the preferred embodiment illustrated is mounted horizontally in an air passage formed partially by the passenger compartment roof. A fan is located below the radiator for drawing air therethrough when the vehicle is idling. The fan is powered by a hydraulic motor which receives pressurized coolant from the engine water pump.

1 Claim, 2 Drawing Figures

U.S. Patent   Jan. 27, 1976   3,934,644
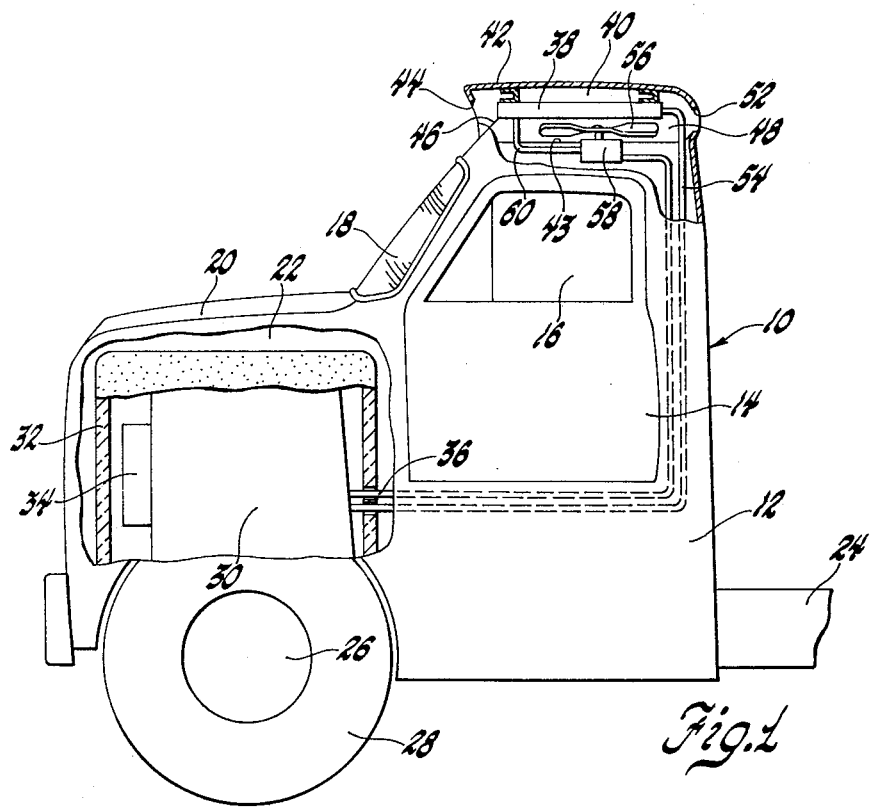
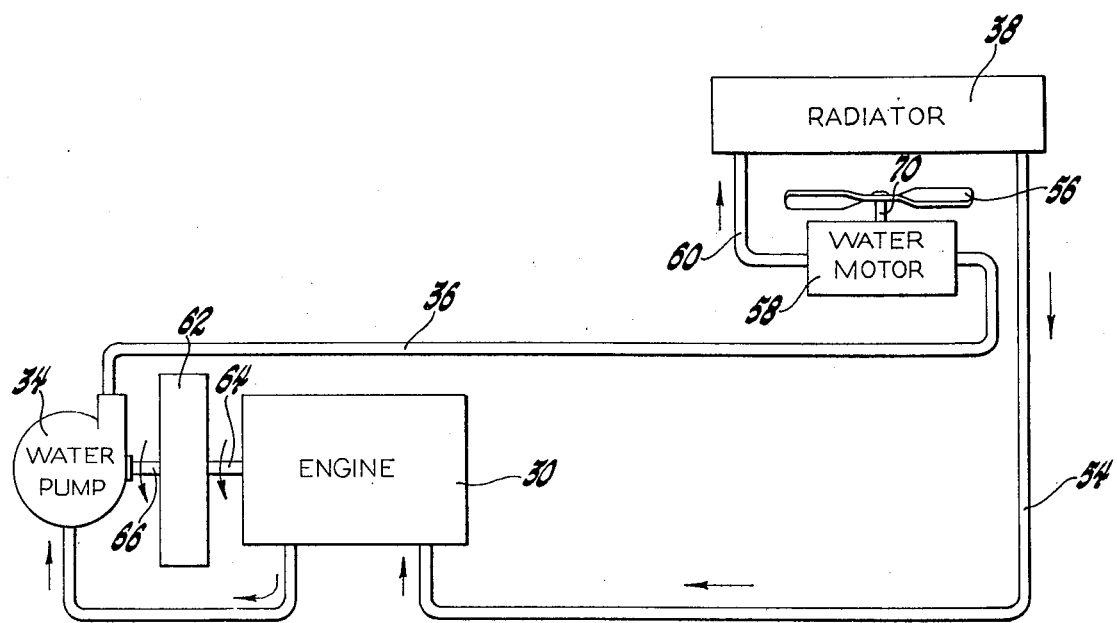

REMOTE ENGINE WATER COOLER

This invention relates to cooling systems for motor vehicle engines and, specifically, to remotely located liquid radiators and hydraulic powered fan means for drawing air through them.

In motor vehicles, particularly trucks, the noise emitted from the engine can be diminished by completely enclosing the engine in an insulated compartment. When the engine is so enclosed, however, the liquid-filled radiator and associated fan assembly for cooling the engine must be relocated. The present invention locates the radiator and fan assembly in air passage means formed partially by the vehicle roof structure. This is a desirable location in that an air inlet can be formed above the windshield to accept air flowing over the vehicle. Also a rearwardly facing outlet can be provided to discharge the air after passing through the radiator. When a forwardly facing air inlet is utilized, the air flow through the radiator is assisted by the passage of air around the vehicle associated with its forward motion.

A disadvantage with this remote location is that the fan assembly may not be conveniently driven directly by the vehicle engine as is conventionally done with grill mounted radiators. This problem is solved in the present invention by employing a high output water pump directly powered by the engine used to drive a fan connected hydraulic motor. The coolant in the engine is withdrawn by the water pump, subsequently pressurized and pumped to the remote radiator for cooling. Prior to entering the radiator, the pressurized water flows through the hydraulic motor which is coupled to the fan and used to draw air through the radiator during idle conditions. Energy is extracted from the coolant by the hydraulic motor which is used to power the fan. The coolant then flows through the radiator, where it loses heat prior to returning to the engine. In order to reduce the water pump outlet during periods when the cooling demand decreases, a viscous drive coupling is employed between the engine and the water pump to provide reduced operation of the water pump. Without the coupling to reduce pump output, it would be difficult to maintain a predetermined desirable engine temperature at low speeds. Another means of reducing the pump outlet would be the employment of a thermostatically controlled bypass.

A principle advantage of the aforedescribed remotely located cooling system having a coolant powered fan motor is the elimination of a separate fan drive requiring additional lines, electrical or hydraulic, between the engine compartment and the radiator location. This is particularly important in a vehicle where there is minimal clearance for running extra energy transmitters as is often the case in cab-type vehicles as illustrated.

An object of the present invention is to reduce the noise emitted by the engine of a motor vehicle by enclosing the engine in an insulated compartment and locating rhe engine cooling system, including a radiator and fan assembly, remotely from the engine compartment.

A still further object of the present invention is to reduce noise emitted by the engine of a motor vehicle by situating the engine in an enclosed and insulated compartment and utilizing a remotely located cooling system which includes a radiator, a fan and a coolant-powered motor for driving the fan.

Further objects and advantages of the present invention will be more readily apparent from the following detailed description, reference being had to the accompanying drawings in which a preferred embodiment is clearly illustrated.

IN THE DRAWINGS:

FIG. 1 is a partially sectioned view of a truck type motor vehicle disclosing the present invention;

FIG. 2 is a schematic view of the remotely located engine cooling system shown in FIG. 1.

In FIG. 1 of the drawings, a truck type motor vehicle 10 is illustrated including a cab portion 12, side door 14, window 16, windshield 18 and hood 20 adapted to partially enclose an engine compartment 22. The cab body 12 is mounted upon a frame 24 which supports an axle (not visible) with a wheel 26 and tire 28 mounted thereon. An engine 30 is adapted to be supported by the frame 24 within engine compartment 22. The engine 30 may be an internal combustion engine of the Otto cycle or the diesel cycle type. The engine 30 is enclosed within the engine compartment 22 by insulation 32 which surrounds the engine.

The engine 30 utilizes liquid coolant for maintaining desirable engine temperatures. In FIG. 2, a water or coolant pump 34 is supported at the front of the engine 30 for withdrawing coolant from the engine's water passages and pumping it through a conduit 36 to a radiator 38 mounted in a remote location with respect to the engine. Specifically, the radiator 38 is mounted within an air passage 40 formed partially by the roof structure 42 of the cab 12 and partially by the ceiling 43 of the passenger compartment. An air inlet opening 44 at the front of air passage 40 is located directly above the windshield 18 and is directed to receive air which flows over the moving vehicle. A diverter wall 46 directs the air from opening 44 to the upper surface of the radiator 38. It then flows through radiator 38 into a lower chamber 48 formed between radiator 38 and ceiling 43. The air is then discharged through a rearwardly directed air outlet 52. The air flowing through radiator 38 cools the fluid therein, which returns to engine 30 through a conduit 54.

The aforedescribed operation of the cooling system is effective when the vehicle is moving. Then air flows into air outlet 44 by its movement over the vehicle. However, when the vehicle is moving at a slow speed or is standing still, air must be drawn through inlet 44 and radiator 38 and discharged from outlet 32 by a fan to effectively cool engine 30. Therefore, a fan assembly 56 is mounted below the radiator 38 to draw air through radiator 38. Because of the remote location of the fan 56, it is impractical to power the fan assembly by a direct connection with the engine 30. Therefore, the present invention utilizes a coolant powered motor 58 to rotate fan 56. The motor 58 is fluidly connected between the engine 30 and radiator 38 and pressurized coolant from the water pump 34 is supplied by conduit 36. A portion 60 of conduit 36 connects the outlet of the coolant powered motor 58 with the inlet of radiator 38. Thus, the coolant powered motor 58 utilizes energy of the coolant to drive fan 56 to cause air to flow through radiator 38.

To provide operative flexibility for the cooling system, a viscous drive coupling 62 is used between the engine drive 64 and the water pump input 66 as is shown in FIG. 2. The viscous drive coupling is employed as a means to reduce the output of the water pump when the engine cooling requirements decrease. The viscous drive coupling is similar to the present production for coupling used on General Motors' automobiles. Without the viscous coupling 62 or equivalent means, the output of the water pump will not be reduced sufficiently under certain operating conditions to prevent the radiator and fan assembly 56 from overcooling the engine and thus reducing engine temperatures below a desirable temperature.

In place of the viscous clutch coupling 62, an equivalent means would be to employ a bypass in parallel with the pump 34 and utilized thermostatic valve means therein to regulate coolant temperature.

Although the embodiment illustrated and described above is a preferred embodiment, other embodiments may be adapted.

What is claimed is as follows:

1. A motor vehicle with a liquid cooled engine surrounded by noise insulating material; engine cooling apparatus including air passage means formed between the vehicle roof structure and the ceiling of the vehicle passenger compartment; said air passage means having a forwardly opening air inlet and a rearwardly opening air outlet; a radiator supported within said air passage means in the path of air flowing therethrough; liquid passage means in said radiator for transmitting heat from liquid coolant warmed by the engine to air flowing between said inlet and outlet; conduit means extending from said engine through said noise insulating material and through the walls of said vehicle passenger compartment to said radiator; a water pump operably driven by the vehicle engine in fluid circuit therewith and with said radiator for passing coolant therethrough; a fan located adjacent said radiator for causing air to pass therethrough when vehicle speed is insufficient to cause movement of appreciable quantities of cooling air; hydraulic motor means operably attached to said fan and in circuit with said water pump, said conduits and said radiator for receiving pressurized fluid from the hydraulic motor to rotate said fan.

* * * * *